(12) United States Patent
Kashibuchi

(10) Patent No.: US 10,366,539 B2
(45) Date of Patent: Jul. 30, 2019

(54) INFORMATION PROCESSING APPARATUS, INFORMATION PROCESSING METHOD, AND STORAGE MEDIUM FOR REPORTING BASED ON ELAPSE TIME AND POSITIONAL RELATIONSHIPS BETWEEN 3-D OBJECTS

(71) Applicant: CANON KABUSHIKI KAISHA, Tokyo (JP)

(72) Inventor: Yoichi Kashibuchi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/417,066

(22) Filed: Jan. 26, 2017

(65) Prior Publication Data

US 2017/0228886 A1 Aug. 10, 2017

(30) Foreign Application Priority Data

Feb. 5, 2016 (JP) .................................. 2016-021057

(51) Int. Cl.
*G06T 19/00* (2011.01)
(52) U.S. Cl.
CPC .................................. *G06T 19/006* (2013.01)
(58) Field of Classification Search
None
See application file for complete search history.

(56) References Cited

U.S. PATENT DOCUMENTS

| 9,959,762 | B1* | 5/2018 | Kim | G08G 1/16 |
| 2015/0109335 | A1* | 4/2015 | Hayakawa | G06K 9/6217 |
| | | | | 345/633 |
| 2015/0138233 | A1* | 5/2015 | Frushour | G06T 19/006 |
| | | | | 345/633 |
| 2016/0078641 | A1* | 3/2016 | Aratani | G06T 7/73 |
| | | | | 345/633 |
| 2016/0216521 | A1* | 7/2016 | Yachida | G01C 21/365 |
| 2017/0337750 | A1* | 11/2017 | McKenzie | G06T 19/20 |

FOREIGN PATENT DOCUMENTS

| JP | 2006-302035 A | 11/2006 |
| JP | 5777786 B1 * | 9/2015 ............... G06T 7/73 |

* cited by examiner

*Primary Examiner* — Michael J Cobb
(74) *Attorney, Agent, or Firm* — Canon U.S.A., Inc. IP Division

(57) ABSTRACT

An information processing apparatus that causes a display unit to display a three-dimensional space in which a first virtual object and a second object are present includes a determination unit that determines a positional relationship between the first virtual object and the second object in the three-dimensional space and a report unit that reports that a distance between the first virtual object and the second object is less than or equal to a predetermined value based on a determination result obtained by the determination unit.

8 Claims, 15 Drawing Sheets

INFORMATION PROCESSING APPARATUS, INFORMATION PROCESSING METHOD, AND STORAGE MEDIUM FOR REPORTING BASED ON ELAPSE TIME AND POSITIONAL RELATIONSHIPS BETWEEN 3-D OBJECTS

BACKGROUND

Field

The present disclosure relates to an information processing apparatus, an information processing method, and a storage medium. In particular, the present disclosure relates to a mixed reality system.

Description of the Related Art

Prototype based evaluations can be employed in the fields of design and manufacturing. In recent years, strict requirements in the prototype based evaluations are period shortening and expense reduction. A mixed reality (MR) system is already introduced to virtually evaluate the ease in assembling and maintenance by using shape and design data created by a computer aided design (CAD) system.

As a representative evaluation item, it is known to evaluate a possibility that a tool can cause interference with a component other than a target component during a work by using only virtual components without using any real component.

As discussed in Japanese Patent Application Laid-Open No. 2006-302035, there is a conventional method for reporting an interference portion with an arbitrary color if virtual objects interfere with each other when at least one of them is moving in a mixed reality system that performs the above-mentioned evaluation.

According to the method discussed in Japanese Patent Application Laid-Open No. 2006-302035, if the virtual object interference determination becomes unstable due to noise or reduction in position and orientation estimation accuracy, excessive presenting a report to a user can occur when the reporting method is not appropriate. This tends to occur when switching of a virtual object interference determination result, i.e., interference or non-interference, occurs a plurality of times at short intervals of time. In particular, excessive presentation of a report needs to be addressed in a case where a user wears a head mounted display (hereinafter referred to as HMD) or a similar display device that covers the entire field of view and enables a user to view a video at a short distance.

What is needed is a report regarding an interference between a virtual object and a target object be provided while preventing the interference report from being excessively presented to a user.

SUMMARY

According to an aspect of an embodiment, an information processing apparatus that causes a display unit to display a three-dimensional space in which a first virtual object and a second object are present includes a determination unit configured to determine a positional relationship between the first virtual object and the second object in the three-dimensional space, and a report unit configured to report, based on a determination result obtained by the determination unit, that a distance between the first virtual object and the second object is less than or equal to a predetermined value. The report unit does not report if the distance becomes less than or equal to the predetermined value again before a predetermined time elapses since a previous report and reports if the distance becomes less than or equal to the predetermined value again after the predetermined time has elapsed since the previous report.

Further features will become apparent from the following description of exemplary embodiments with reference to the attached drawings.

DESCRIPTION OF THE EMBODIMENTS

Hereinafter, exemplary embodiments will be described in detail below with reference to attached drawings.

Figure 1:
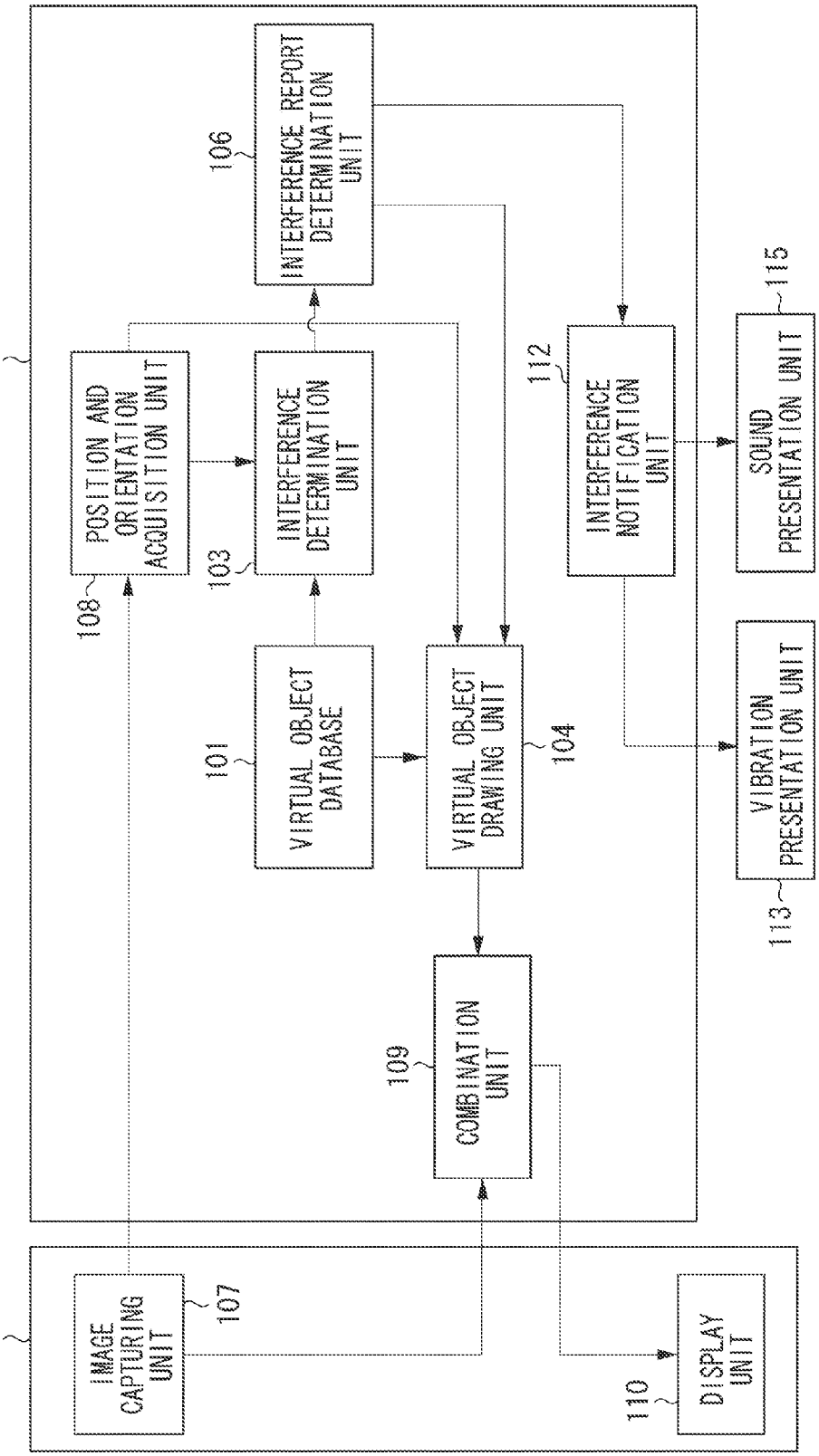
FIG. 1 is a block diagram illustrating a functional configuration of an information processing apparatus according to a first exemplary embodiment.
Figure 2:
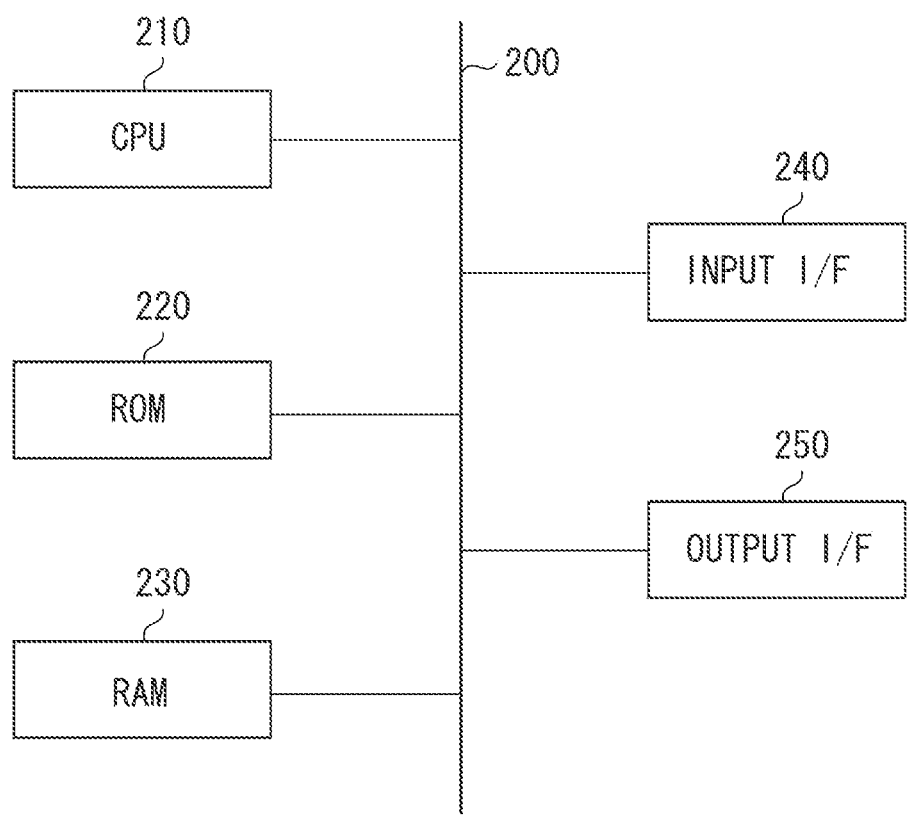
FIG. 2 illustrates an example of a hardware configuration of the information processing apparatus according to the first exemplary embodiment.

A first exemplary embodiment will be described below. FIG. 1 is a block diagram illustrating a functional configuration of an information processing apparatus 100 according to the present exemplary embodiment. FIG. 2 illustrates an example of a hardware configuration of the information processing apparatus according to the present exemplary embodiment.

In FIG. 2, a central processing unit (CPU) 210 controls various devices connected via a bus 200. The CPU 210 can read a program from a read only memory (ROM) 220 and can execute predetermined processing according to the read program. An operating system (OS), processing programs according to the present exemplary embodiment, and device drivers are stored in the ROM 220 and can be appropriately executed by the CPU 210 when they are temporarily stored in a random access memory (RAM) 230. An input interface (I/F) 240 can receive an input signal including a predetermined format that can be processed by the information processing apparatus 100 from an external apparatus, e.g., an image capturing apparatus or an operation apparatus. An output I/F 250 can output an output signal including a predetermined format that can be processed by an external apparatus, such as a display apparatus, e.g., head mounted display (HMD).

As illustrated in FIG. 1, the information processing apparatus 100 according to the present exemplary embodiment is connected to an HMD 102. The information processing apparatus 100 combines a reality space image captured by an image capturing unit 107 provided in the HMD 102 with a virtual space image and outputs a mixed reality video to a display unit 110 provided in the HMD 102.

The image capturing unit 107 captures an image of a reality space and inputs the captured image to the information processing apparatus 100. A combination unit 109 combines the image captured by the image capturing unit 107 with a virtual object image. The display unit 110 displays the combined image as a composite image. In the present exemplary embodiment, the image capturing unit 107 is located in the HMD 102. The image capturing unit 107 includes two image sensors, i.e., an image sensor for a user's right eye and an image sensor for a user's left eye, and inputs two respective images captured for the user's right eye and the user's left eye to the information processing apparatus 100.

The display unit 110 can present the composite image drawn by the combination unit 109 to a user wearing the HMD 102. In the present exemplary embodiment, the display unit 110 is a built-in display device located in the HMD 102. The display unit 110 includes two display devices to present two composite images for the user's right eye and the user's left eye.

A vibration presentation unit 113 receives an interference informing output from an interference notification unit 112 and generates vibrations stimulating the tactile senses of the user to inform the occurrence of interference. In the present exemplary embodiment, the vibration presentation unit 113 is a device including a motor equipped with an eccentric weight attached to a distal end thereof. The vibration presentation unit 113 is attached to a part of the user's body. The vibration presentation unit 113 according to the present invention is not limited to the above-mentioned example. For example, a device that causes weak electric current to flow across an electrode attached to a user's fingertip is employable if it stimulates the tactile senses.

A sound presentation unit 115 receives the interference informing output from the interference notification unit 112 and generates sounds stimulating the user's auditory perception to inform the occurrence of interference. In the present exemplary embodiment, the sound presentation unit 115 is a speaker separate from the information processing apparatus 100. For example, the sound presentation unit 115 can provide sounds through headphones built into the HMD 102. Alternatively, a stationary type speaker can be used as the sound presentation unit 115. The speaker can be incorporated into the information processing apparatus 100. Any type of sound can be used if it stimulates the user's auditory perception. For example, beep sounds with a predetermined wavelength can be used.

The information processing apparatus 100 includes a virtual object database 101, an interference determination unit 103, a virtual object drawing unit 104, a position and orientation acquisition unit 108, the combination unit 109, an interference report determination unit 106, and the interference notification unit 112.

To realize the above-mentioned functional units, the CPU 210 executes each program loaded from the ROM 220 into the RAM 230 and performs processing according to each flowchart described below. For example, in a case where the software processing performed by the CPU 210 is replaced by a hardware configuration, an appropriate number of calculation units and circuits can be used to realize the above-mentioned processing of respective functional units.

The virtual object database 101 can store virtual object models. For example, each virtual object model includes information about shape, display color, interference report color, i.e., color used to report interference, and initial position and orientation. The display color and the report color are color information used when the virtual object drawing unit 104 draws a virtual space image. In the present exemplary embodiment, the virtual object drawing unit 104 displays a target virtual object with the display color if the virtual object is in a non-interfere state, and with the report color if the virtual object is in an interfere state.

In the present exemplary embodiment, each virtual object is pre-registered in the virtual object database 101. However, another virtual object is employable. For example, parallax images obtained by the image capturing unit 107 are usable to estimate the depth and the shape of a real substance through stereo matching and obtain a virtual object. In this case, the virtual object can be drawn through the texture matching using captured images with the report color obtained from pre-registered color information.

Figure 3A:
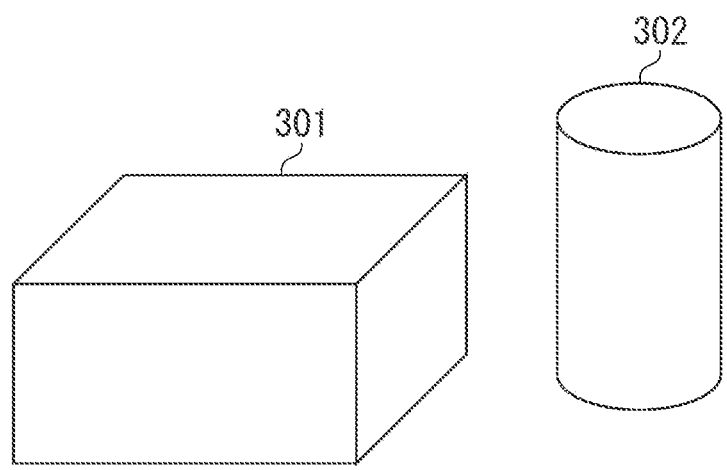
FIGS. 3A and 3B schematically illustrate virtual space images according to the first exemplary embodiment.

In the present exemplary embodiment, it is assumed that a virtual object 301 includes a rectangular parallelepiped shape and another virtual object 302 includes a columnar shape, as illustrated in FIG. 3A.

The position and orientation acquisition unit 108 estimates the position and orientation of the image capturing unit 107, (i.e., the position and orientation of the HMD 102, in the reality space and estimates the position and orientation of each virtual object, based on the images acquired by the image capturing unit 107 (image acquisition). In the present exemplary embodiment, it is assumed that the position and orientation of the image capturing unit 107 is the position and orientation of a user's viewpoint. Calculation of the position and orientation of the image capturing unit 107 is performed based on a captured image of markers located in the reality space.

In calculating the position and orientation of a virtual object, for example, a real substance corresponding to the virtual object is pre-positioned in the reality space. In this case, markers are put on the real substance. The position and orientation acquisition unit 108 estimates the position and orientation of the real substance based on images capturing the markers and estimates the estimated position and orientation of the real substance as the position and orientation of the virtual object corresponding to the real substance. A user can change the position and orientation of the virtual object by moving the real substance. However, in the present exemplary embodiment, the method for acquiring the viewpoint position and orientation of the experiencing person or the position and orientation of the virtual object is not limited to the above-mentioned example.

For example, a three-dimensional sensor can be attached to or incorporated in a real substance and a commercially available motion capture system is usable to measure the position and orientation of a virtual object relative to the image capturing unit 107. Instead of using the markers, image feature quantities obtainable from captured images can be used to estimate the position and orientation of a virtual object. Instead of preparing a real substance corresponding to a virtual object, it can be configured to display a virtual object at a predetermined position and move the virtual object by using a controller.

The interference determination unit 103 determines the presence of any interference between a plurality of virtual objects with reference to the position and orientation of the virtual object as well as the shape of the virtual object. The interference between two virtual objects can be determined according to the following procedure.

The procedure includes extracting triangular polygons from respective virtual objects and determining whether the extracted triangular polygons are in an intersectional state for all combinations thereof. The interference determination unit 103 determines that the virtual objects interfere with each other if there is at least one combination of the triangular polygons that are in the intersectional state. The above-mentioned procedure is repetitively performed for all combinations of virtual objects. However, the method for realizing the interference determination unit 103 according to the present exemplary embodiment is not limited to the above-mentioned example. In the present exemplary embodiment, the interference state is defined as a state where virtual objects are in contact with each other. Alternatively, the interference state can be defined as a state where the distance between virtual objects is less than or equal to a predetermined value.

The interference report determination unit 106 determines whether to perform a report for a virtual object that includes triangular polygons in an intersectional state when it is the interference virtual object determined by the interference determination unit 103 and can output a report determination result as described in detail below.

The virtual object drawing unit 104 generates an image in which the virtual objects 301 and 302 are drawn. More specifically, in generating the image, the virtual object drawing unit 104 refers to the model data stored in the virtual object database and the report determination result obtained by the interference report determination unit 106.

First, to generate a virtual space image, the virtual object drawing unit 104 acquires information about the position and orientation of a virtual viewpoint from the position and orientation acquisition unit 108. For example, information about the position and orientation of the image capturing unit 107 in a world coordinate system can be input as the position and orientation of the virtual viewpoint. The virtual object drawing unit 104 updates three-dimensional vertex positions of the virtual objects 301 and 302 based on the position and orientation information acquired by the position and orientation acquisition unit 108. The virtual object drawing unit 104 projects the updated three-dimensional vertex positions of the virtual objects on a projection plane set based on the virtual viewpoint. Processing for drawing projected polygons is similar to drawing processing in general three-dimensional image generation. Therefore, redundant description thereof will be avoided.

Figure 3B:
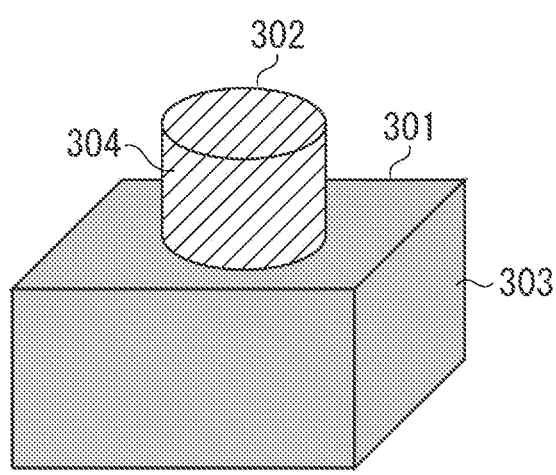

FIG. 3B illustrates a virtual space image generated by the virtual object drawing unit 104 according to the present exemplary embodiment.

The virtual object drawing unit 104 draws the virtual objects 301 and 302 with the display color or the report color described above based on the report determination result.

More specifically, the virtual object drawing unit 104 draws the virtual object 301 with a report color 303 and draws the virtual object 302 with a report color 304. If the interference report determination unit 106 determines to perform an interference report because of the interference between the virtual objects 301 and 302, the virtual object drawing unit 104 draws both virtual objects with the report colors. However, the configuration is not limited to the illustrated example. For example, the virtual object drawing unit 104 can be configured to set the report color for only one of the virtual objects in performing the interference report. Instead of setting a unique report color for each virtual object, it is feasible to set a common report color for respective virtual objects and determine whether to perform the interference report for each virtual object.

The combination unit 109 combines the reality space image obtained by the image capturing unit 107 with the virtual space image drawn by the virtual object drawing unit 104. The combination processing can be realized by superimposing the virtual space image on the reality space image obtained by the image capturing unit 107. More specifically, a composite image generated by the combination unit 109 is constituted by specific pixels representing the virtual objects 301 and 302 and the remaining pixels representing the reality space image.

The interference notification unit 112 notifies another notification unit (not illustrated) of a current interference state based on the report determination result obtained by the interference report determination unit 106. In the present exemplary embodiment, the virtual object drawing unit 104 draws the virtual objects 301 and 302 with the report color so that the interference state can be explicitly presented to a user based on the visual display. However, only using the visual display may be insufficient to enable the user to perceive the interference state if the interference place is out of the view field of the image capturing unit 107. In such a case, using an interference presentation method capable of stimulating both the auditory perception and the tactile senses is useful to enable the user to clearly perceive the interference having occurred out of the view field.

Figure 4:
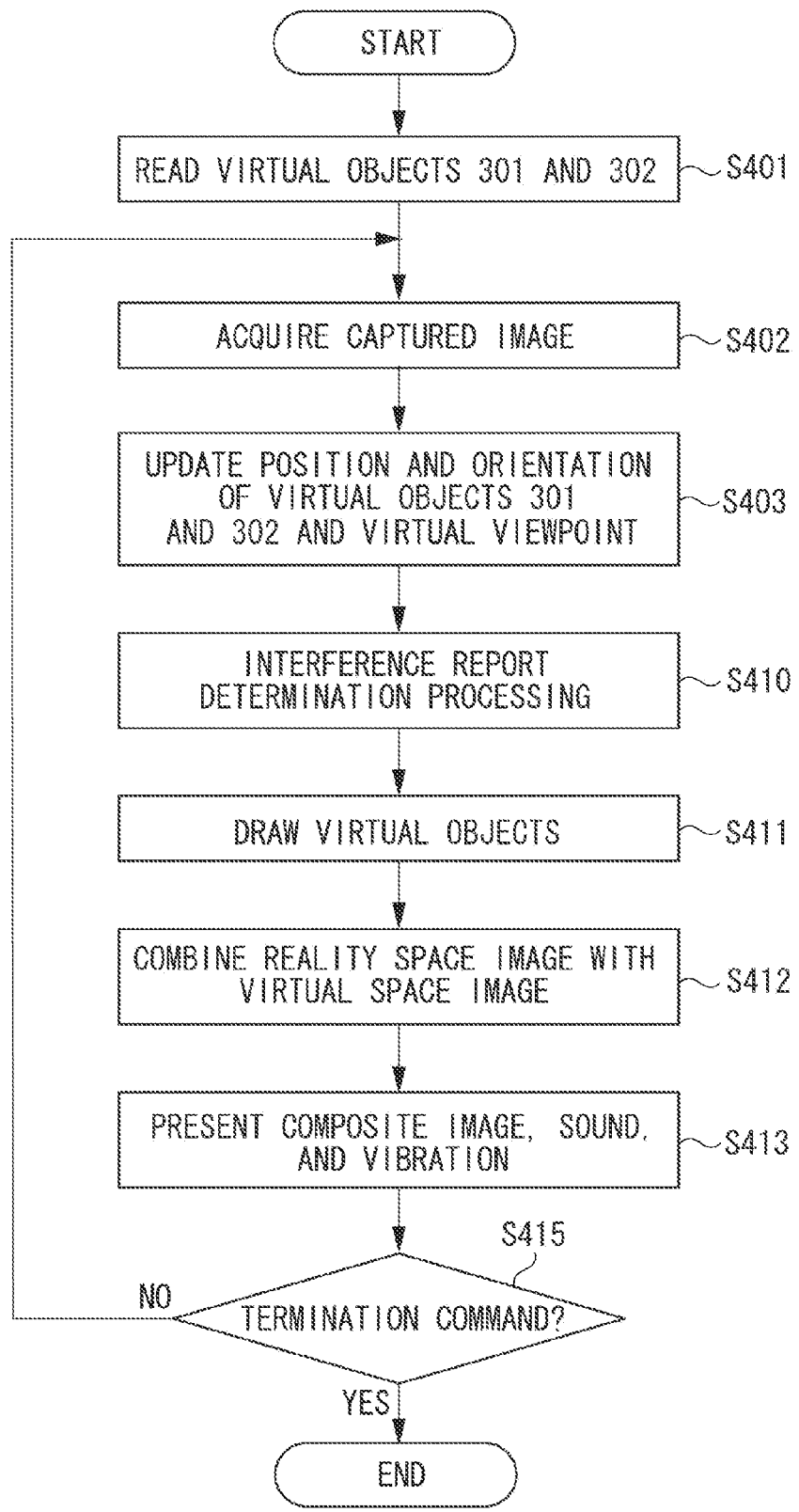
FIG. 4 is a flowchart illustrating details of exemplary processing performed by the information processing apparatus according to the first exemplary embodiment.

FIGS. 3A and 3B schematically illustrate examples of the virtual space image according to the present exemplary embodiment. FIG. 4 is a flowchart illustrating details of exemplary processing performed by the information processing apparatus according to the present exemplary embodiment.

The exemplary processing performed by the information processing apparatus according to the present exemplary embodiment, with reference to the virtual objects 301 and 302, will be described in detail below with reference to FIGS. 3A, 3B, and 4.

In step S401, the virtual object drawing unit 104 reads data relating to the virtual objects 301 and 302 from the virtual object database 101.

In step S402, the position and orientation acquisition unit 108 acquires a reality space image obtained by the image capturing unit 107. Then, the position and orientation acquisition unit 108 calculates information about the position and orientation of the image capturing unit 107 based on the acquired image. The information processing apparatus temporarily stops following processing to be performed in step S402 and subsequent steps until the reality space image acquired by the image capturing unit 107 is updated. The information processing apparatus starts the following processing in step S402 and subsequent steps when the reality space image is updated. In the present exemplary embodiment, the information processing apparatus performs the above-mentioned processing each time the image acquired by the image capturing unit 107 is updated. However, the configuration is not limited thereto, and, as another exemplary embodiment, the information processing apparatus can be configured to perform the above-mentioned processing at a time when the position and orientation information is newly acquired by the position and orientation acquisition unit 108.

In step S403, the position and orientation acquisition unit 108 outputs the position and orientation information to the interference determination unit 103 and the virtual object drawing unit 104.

In step S410, the information processing apparatus performs interference report determination processing described below to determine whether the virtual objects 301 and 302 interfere with each other and sets a color to be used in drawing each virtual object.

In step S411, the virtual object drawing unit 104 draws virtual space images representing respective virtual objects. In the present exemplary embodiment, the virtual object drawing unit 104 draws the virtual objects 301 and 302 with reference to the triangular polygon information and the above-mentioned color having been set in step S410.

In the state illustrated in FIG. 3B, the virtual object 301 is drawn with the report color 303 and the virtual object 302 is drawn with the report color 304 because it is determined that the virtual object 301 and the virtual object 302 interfere with each other during a report interval longer than a regulation interval.

In step S412, the combination unit 109 generates a composite image by combining the reality space image obtained by the image capturing unit 107 with the virtual space image.

In step S413, the display unit 110 displays the composite image combined by the combination unit 109 to present the composite image to a user wearing the HMD 102. Further, the vibration presentation unit 113 and the sound presentation unit 115 present vibrations and sounds, respectively, to the user with reference to the information notified by the interference notification unit 112.

In step S415, the information processing apparatus determines whether a termination command from the user is entered via an appropriate input apparatus, e.g., a keyboard. If it is determined that the termination command is not entered (NO in step S415), the operation returns to step S402. If it is determined that the termination command has been entered (YES in step S415), the information processing apparatus terminates the processing of the flowchart illustrated in FIG. 4.

Figure 5:
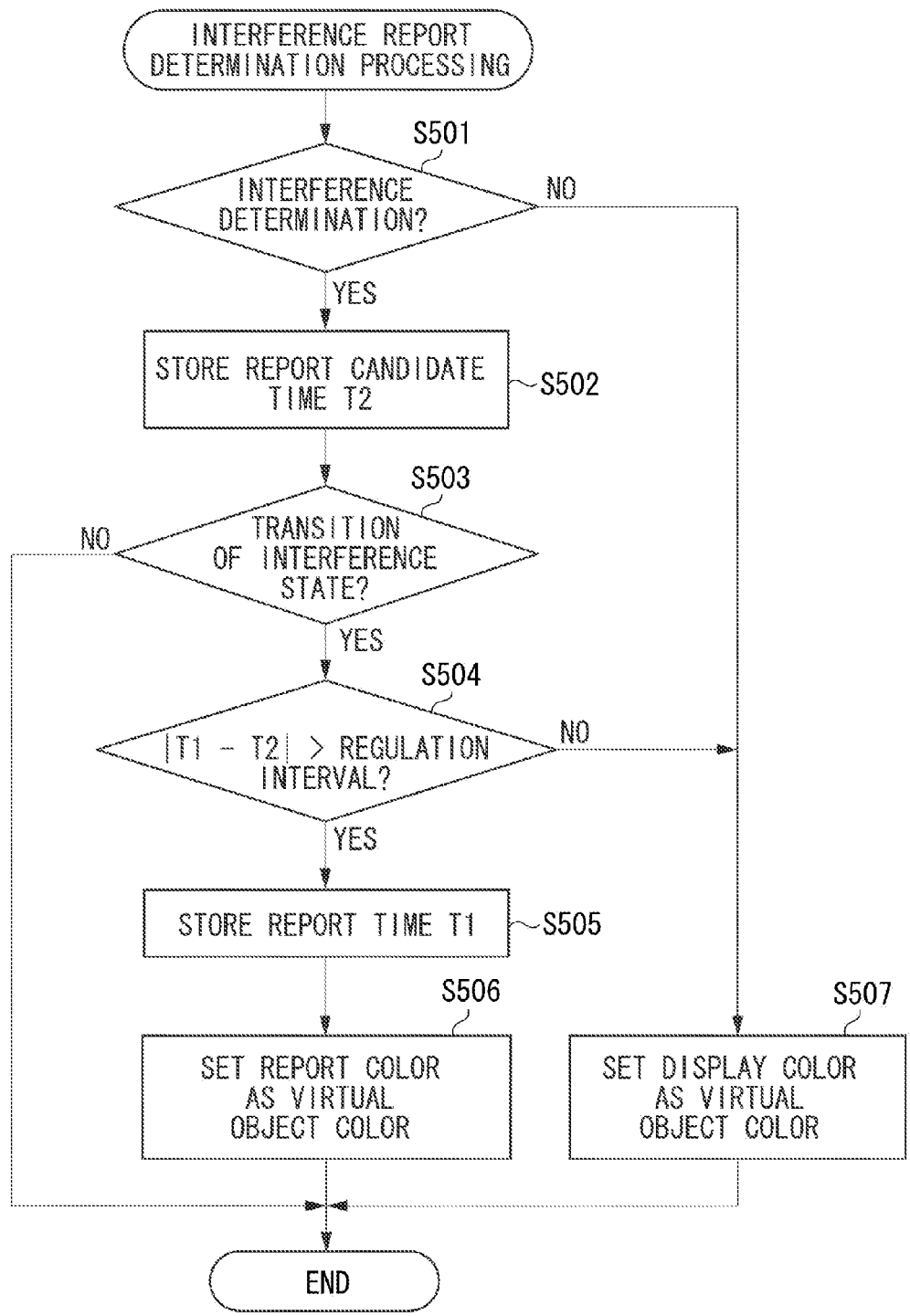
FIG. 5 is a flowchart illustrating details of interference report determination processing according to the first exemplary embodiment.

FIG. 5 is a flowchart illustrating details of the interference report determination processing performed in step S410.

In step S501, the interference determination unit 103 determines whether each of the polygons constituting the virtual objects 301 and 302 is in an intersectional state referring to the virtual objects 301 and 302 stored in the RAM 230.

FIG. 3B illustrates an interference state of the virtual object 301 and the virtual object 302, which can be observed when a marker corresponding to the virtual object 302 is moved by the user. Accordingly, the operation proceeds to step S507 when the virtual objects 301 and 302 do not interfere with each other as illustrated in FIG. 3A. The operation proceeds to step S502 when the virtual objects 301 and 302 interfere with each other as illustrated in FIG. 3B.

In step S502, the interference report determination unit 106 stores information about a report candidate time T2 in the RAM 230. In the present exemplary embodiment, the report candidate time T2 is system time indicating the occurrence of the interference determined by the interference determination unit 103 in step S501.

In step S503, the interference report determination unit 106 determines whether the interference report state has shifted. More specifically, if the interference report state shifts from a non-interference state to an interference state with respect to the virtual objects 301 and 302 (YES in step S503), the operation proceeds to step S504. If the interference state remains the same (NO in step S503), the information processing apparatus terminates the processing of the flowchart illustrated in FIG. 5.

In step S504, the interference report determination unit 106 obtains the report interval, which is a difference between a report time T1 described below and the above-mentioned report candidate time T2, and determines whether the obtained report interval is greater than the regulation interval. In the present exemplary embodiment, the regulation interval is a predetermined time interval, e.g., one second. However, the regulation interval is not limited to the above-mentioned example and can be a time value longer than the interference determination interval of the interference determination unit 103.

If the report interval is longer than the regulation interval (YES in step S504), the operation proceeds to step S505. If the report interval is not longer than the regulation interval (NO in step S504), the operation proceeds to step S507. In the present exemplary embodiment, the regulation interval is not limited to a predetermined time value. For example, the interference determination unit 103 can be configured to dynamically control the regulation interval according to the number of times the interference state has shifted during a predetermined time. In this case, the interference determination unit 103 sets a longer regulation interval if the number of times the interference state has shifted is larger and sets a shorter regulation interval if the number of times the interference state has shifted is smaller.

In step S505, the interference report determination unit 106 stores the report time T1, i.e., the time when the interference has been finally reported, in the RAM 230. In the present exemplary embodiment, the report time T1 is the report candidate time T2 in the state where the report interval has become greater than the regulation interval.

In step S506, the virtual object drawing unit 104 sets a report color selected from the model data stored in the virtual object database as the color to be used in drawing the virtual object.

In step S507, the virtual object drawing unit 104 sets a display color selected from the model data stored in the virtual object database as the color to be used in drawing the virtual object.

As described above, in reporting the interference between the virtual objects 301 and 302, the information processing apparatus according to the present exemplary embodiment changes the display color of the virtual objects according to the time elapsed since the final report, in other words, according to the time elapsed since the previous report. Accordingly, the information processing apparatus can change the frequency of the interference report in such a way as to prevent the report from being excessively presented to a user.

Embodiments are not limited to the information processing apparatus that changes the display colors of respective virtual objects according to the time elapsed since the final report. For example, the information processing apparatus can be configured to change the presentation of vibrations or sounds.

The information processing apparatus according to the present exemplary embodiment controls the report color to be set according to the time elapsed since the previous report. The information processing apparatus can be configured to control a non-report, i.e., display color, to be set according to the time elapsed since a previous non-report, i.e., a display state with the display color. More specifically, it is assumed that a non-contact determination is newly made after the report color is set in response to an interference determination and the interference report is once presented to a user. In this case, the information processing apparatus continues the interference report without setting the non-report (display color) if the time elapsed since the previous non-report (display color) is not longer than a predetermined time. Employing the above-mentioned configuration is useful to prevent the report from being excessively presented to the user.

Hereinafter, a second exemplary embodiment will be described in detail below. In the first exemplary embodiment, as described above, the information processing apparatus changes the virtual object interference report according to the time elapsed since the final report. Accordingly, it is feasible to prevent the report from being excessively presented to the user. However, it can be difficult to report all of the changes occurring in the interference state during the regulation interval.

In the present exemplary embodiment, in addition to above-mentioned contents described in the first exemplary embodiment, the information processing apparatus determines whether to perform the interference report according to the area of the virtual object drawn by the virtual object drawing unit 104. The present exemplary embodiment is differs in part from the above-mentioned first exemplary embodiment in the interference report determination processing. Therefore, portions similar to those already described in the above-mentioned exemplary embodiment are simply denoted by using similar reference numerals and only the characteristic features of the present exemplary embodiment will be described in detail below.

Figure 6:
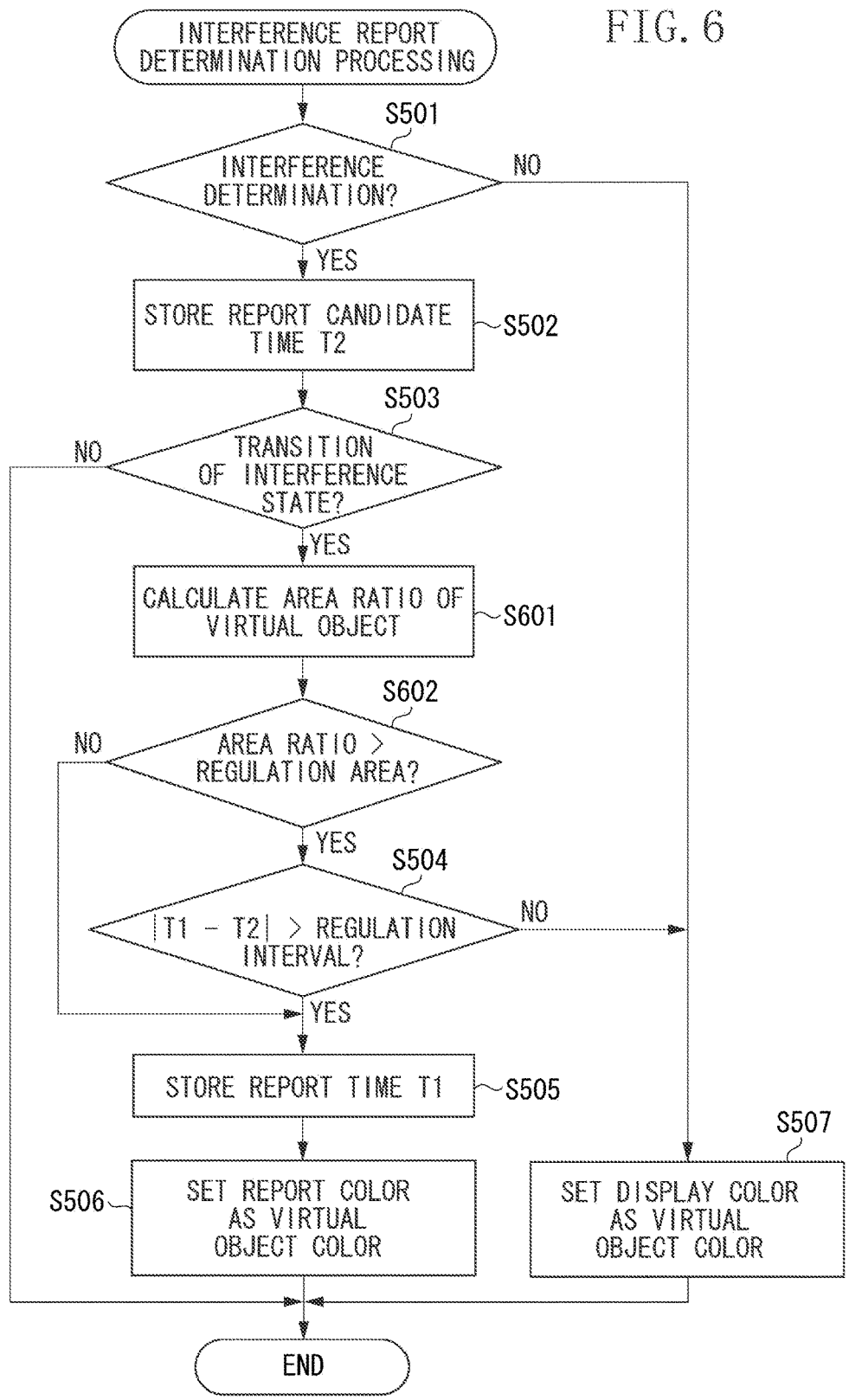
FIG. 6 is a flowchart illustrating details of interference report determination processing according to a second exemplary embodiment.

FIG. 6 is a flowchart illustrating details of the interference report determination processing according to the present exemplary embodiment.

In step S601, the virtual object drawing unit 104 calculates an area ratio, which represents a ratio of the area of a polygon projected when the virtual object is drawn at the present position and orientation relative to the entire display area of the display unit 110.

In step S602, the interference report determination unit 106 determines whether the area of the projected polygon obtained in step S601 is greater than a regulation area. In the present exemplary embodiment, it is assumed that the regulation area is 10%.

Figure 7A:
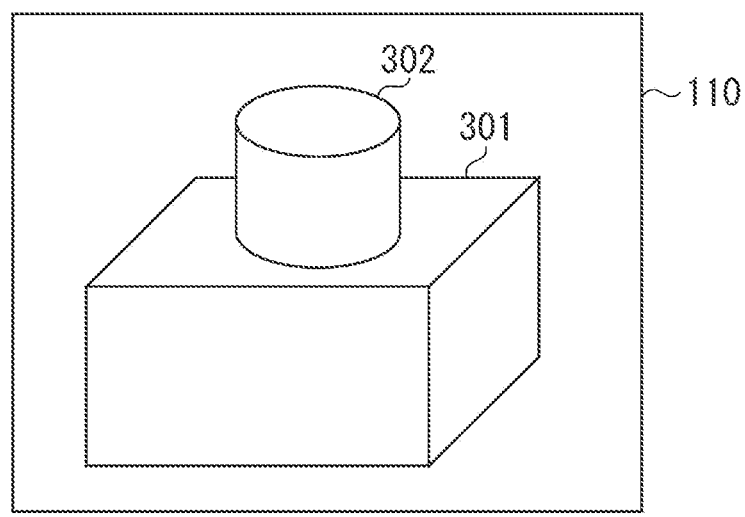
FIGS. 7A and 7B illustrate composite images that can be displayed by a display unit of an information processing apparatus according to the second exemplary embodiment.
Figure 7B:
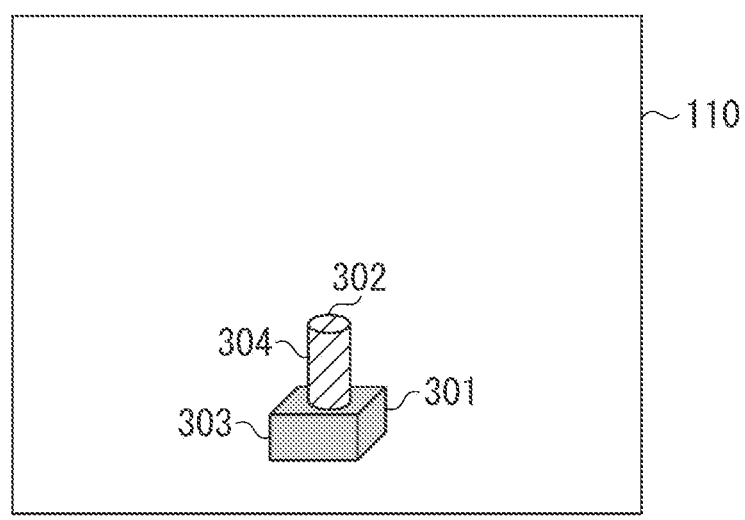

FIGS. 7A and 7B illustrate examples of the composite image displayed by the display unit 110 according to the second exemplary embodiment.

FIG. 7A illustrates a state where the area ratios of the virtual objects 301 and 302 are greater than the regulation area (YES in step S602) and the report interval is smaller than the regulation interval (NO in step S504).

FIG. 7B illustrates a state where the area ratios of the virtual objects 301 and 302 are smaller than the regulation area (NO in step S602) and the report interval is smaller than the regulation interval (NO in step S504).

In FIG. 7B, even in the state where the report interval is smaller than the regulation interval, the area ratios of virtual objects are smaller than the regulation area. Therefore, the virtual object drawing unit 104 draws the virtual object 301 with the report color 303 and draws the virtual object 302 with the report color 304 to visually report the interference to an experiencing person.

In the present exemplary embodiment, unique report colors are allocated to respective virtual objects 301 and 302. However, the above-mentioned example is not limiting. For example, in obtaining the area ratio of each virtual object, if no report color is set for the virtual object 302, the information processing apparatus can obtain the area ratio of only the virtual object to which the report color is set.

As described above, in reporting the interference between the virtual objects 301 and 302, the information processing apparatus according to the present exemplary embodiment refers to the area ratio of each virtual object as well as the time elapsed since the final report. Accordingly, the information processing apparatus can strictly report the interference between the virtual objects if the influence is lesser while preventing the report from being excessively presented to a user.

Hereinafter, a third exemplary embodiment will be described in detail below. The third exemplary embodiment is different from the above-mentioned exemplary embodiment in which markers are attached to a real substance corresponding to a virtual object and the information processing apparatus estimates the position and orientation of each virtual object with reference to the images capturing the markers. The mixed reality system can estimate, in addition to the position and orientation of a virtual object as in the above-mentioned exemplary embodiment, the position and orientation of a user's hand from captured images. Therefore, the mixed reality system can determine whether a virtual object corresponding to the user's hand is in contact with another virtual object. In this case, estimating the position and orientation of the user's hand with reference to feature quantities obtainable from captured images is simpler than putting markers on the user's hand. However, there are many types of hand position and orientation estimation methods, and an appropriate method should be selected based on the usage state or purpose of the mixed reality system. In the present exemplary embodiment, the information processing apparatus selectively use two characteristically different methods and performs virtual object interference determination based on the estimated position and orientation of the user's hand as described in detail below.

Figure 8A:
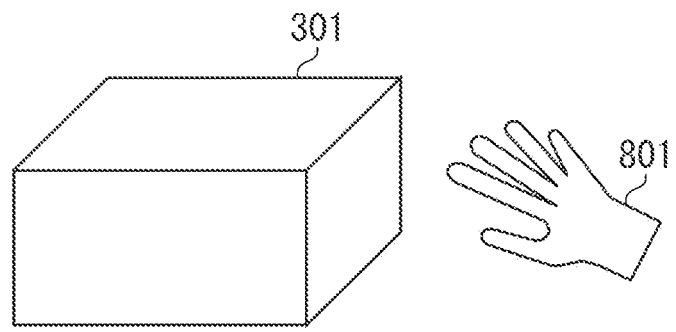
FIGS. 8A, 8B, and 8C schematically illustrate virtual space images according to a third exemplary embodiment.
Figure 8B:
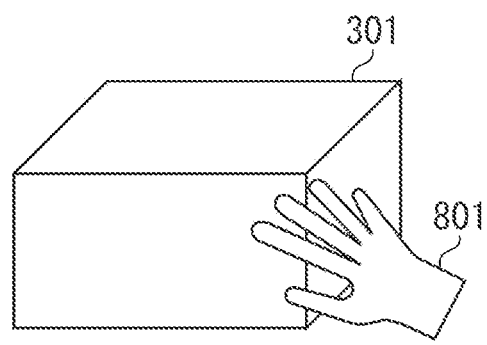
Figure 8C:
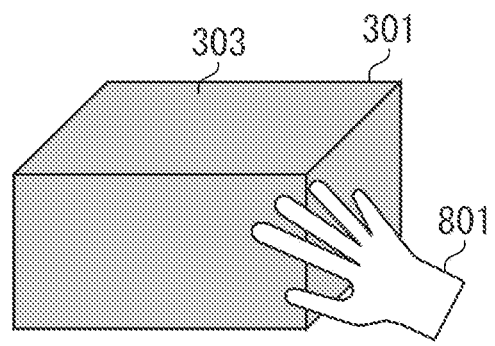

FIGS. 8A, 8B, and 8C schematically illustrate virtual space images according to the third exemplary embodiment. FIG. 8A illustrates a virtual object 801 representing a user's hand in addition to the virtual object 301. To obtain the virtual object 801, the information processing apparatus according to the present exemplary embodiment estimates the position and orientation of the user's hand according to one of the following two methods.

In the present exemplary embodiment, the position and orientation acquisition unit 108 estimates the position and orientation of the image capturing unit 107 and the position and orientation of each virtual object. More specifically, the position and orientation acquisition unit 108 estimates the virtual object 301 with reference to markers put on the real substance, as described above.

The position and orientation acquisition unit 108 estimates the virtual object 801 according to one of two characteristically different position and orientation estimation methods. In this case, the position and orientation acquisition unit 108 selects an appropriate method considering the operational state of the information processing apparatus. A first position and orientation estimation method according to the present exemplary embodiment is characterized by using a surface model that requires a smaller amount of calculations in the estimation although the position and orientation estimation accuracy is lower. The first position and orientation estimation method identifies the position and orientation of a user's hand by obtaining a contour of a flesh color area from each of two parallax images and estimating the depth of each contour according to the stereo matching. A virtual object of the user's hand obtained through the above-mentioned processing is a polygon obtainable by connecting the contours and has no thickness. Therefore, the first position and orientation estimation method can estimate only the position and orientation of a user's hand surface captured in each image. Thus, the position and orientation estimation accuracy is lower in the depth direction of captured images because the thickness of the user's hand is not taken into consideration.

A second position and orientation estimation method according to the present exemplary embodiment is characterized by using a finger model that is highly accurate in the position and orientation estimation although it requires a great amount of calculations. The second position and orientation estimation method identifies the position and orientation of a user's hand by extracting a flesh color area from each captured image and estimating a believable shape by applying a hand skeleton model from various hand shapes. A virtual object of the user's hand obtained through the above-mentioned processing is a polygon that includes information about not only the surface of the user's hand, but also the shape and thickness of the user's hand. Therefore, the second position and orientation estimation method is highly accurate in the position and orientation estimation, compared to the first position and orientation estimation method.

In the present exemplary embodiment, the position and orientation acquisition unit 108 estimates the position and orientation of the virtual object 801 considering the usage state of the information processing apparatus. If the usage rate of the CPU 210 is high, the position and orientation acquisition unit 108 uses the first position and orientation estimation method. If the usage rate of the CPU 210 is low, the position and orientation acquisition unit 108 uses the second position and orientation estimation method. The first and second position and orientation estimation methods are conventionally known and therefore redundant description thereof will be avoided. The control parameter to be taken into consideration in the switching between the first and second position and orientation estimation methods is not limited to the usage rate of the CPU. For example, the usage state of the RAM or the resource of other information processing apparatuses can be taken into consideration in the switching between the first and second position and orientation estimation methods. It is feasible to perform the switching considering another control parameter, such as the quality of images captured by the image capturing unit 107 or the shutter speed of the image capturing unit 107.

Figure 9:
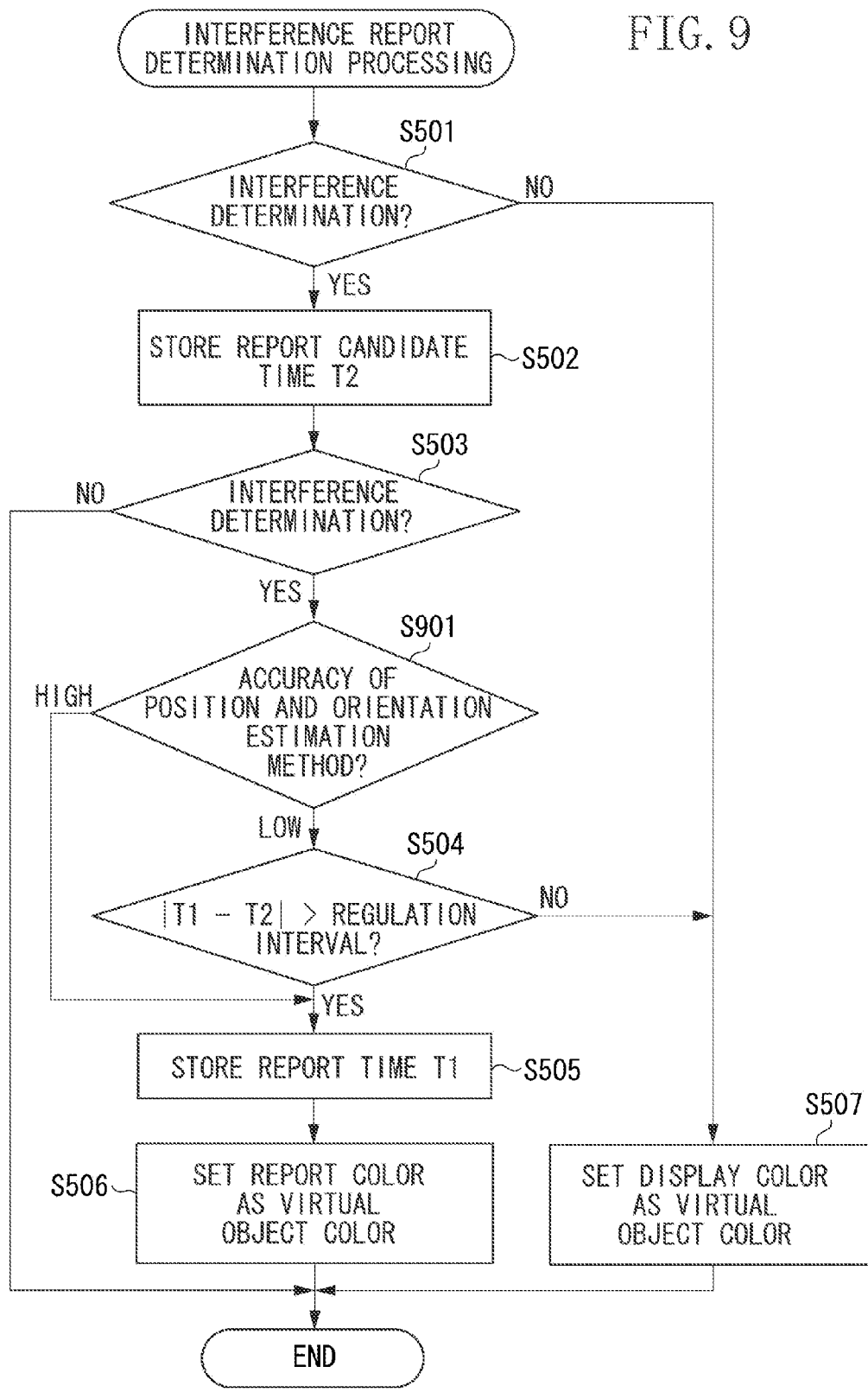
FIG. 9 is a flowchart illustrating details of interference report determination processing according to the third exemplary embodiment.

FIG. 9 is a flowchart illustrating details of interference report determination processing according to the present exemplary embodiment.

In step S901, the interference report determination unit 106 determines whether the method for estimating the position and orientation of the virtual hand object 801 employed by the position and orientation acquisition unit 108 is the first estimation method or the second estimation method.

If the employed position and orientation estimation method is the first estimation method, more specifically, when the surface model having lower estimation accuracy is used, the operation proceeds to step S504. If the employed position and orientation estimation method is the second estimation method, more specifically, when the finger model having higher estimation accuracy is used, the operation proceeds to step S505.

FIG. 8B illustrates a state where the surface model is used to estimate the position and orientation of the virtual object 801 and the report interval is smaller than the regulation interval (NO in step S504). The virtual object 301 is drawn with the display color because the position and orientation estimation of the virtual hand object 801 is performed by using the surface model having lower estimation accuracy and the report interval is smaller than the regulation interval. In the present exemplary embodiment, the polygon of the virtual hand object 801 is drawn through the texture matching using images capturing the contour of the flesh color area.

FIG. 8C illustrates a state where the finger model is used to estimate the position and orientation of the virtual object 801 and the report interval is smaller than the regulation interval (NO in step S504). The virtual object interference determination result is reliable because the position and orientation estimation of the virtual hand object 801 is performed by using the finger model having higher estimation accuracy. Accordingly, when the finger model is used in the position and orientation estimation, the virtual object 301 is drawn with the report color 303 to visually report the interference to the experiencing person even in a state where the report interval is smaller than the regulation interval. In the present exemplary embodiment, no report color is set for the virtual object 801. Therefore, the virtual object 801 is drawn through the texture matching using captured images. However, it is feasible to set a specific report color for the virtual object 801 beforehand and draw the virtual object 801 with the designated report color.

As described above, in reporting the interference between the virtual objects 301 and 801, the information processing apparatus according to the present exemplary embodiment determines whether to control the report based on the time elapsed since the final report according to the virtual object position and orientation estimation method. Accordingly, the information processing apparatus can prevent the report from being excessively presented to the user when the virtual object position and orientation estimation accuracy is low and can accurately present the report to the user when the position and orientation estimation accuracy is high.

Hereinafter, a fourth exemplary embodiment will be described in detail below. In the above-mentioned exemplary embodiment, the information processing apparatus estimates the position and orientation of a flesh color area of a user's hand from a captured image and changes the report of the interference between the user's hand and a virtual object with reference to the position and orientation estimation method and the time elapsed since the final report. However, for example, even if the employed method has higher estimation accuracy, excessive presenting of the report to the user can occur if an image-capturing condition, e.g., illumination, is inappropriate and the obtained accuracy is insufficient.

In the present exemplary embodiment, the information processing apparatus determines whether to perform the interference report additionally considering a temporal change amount of the estimated position and orientation.

Figure 10:
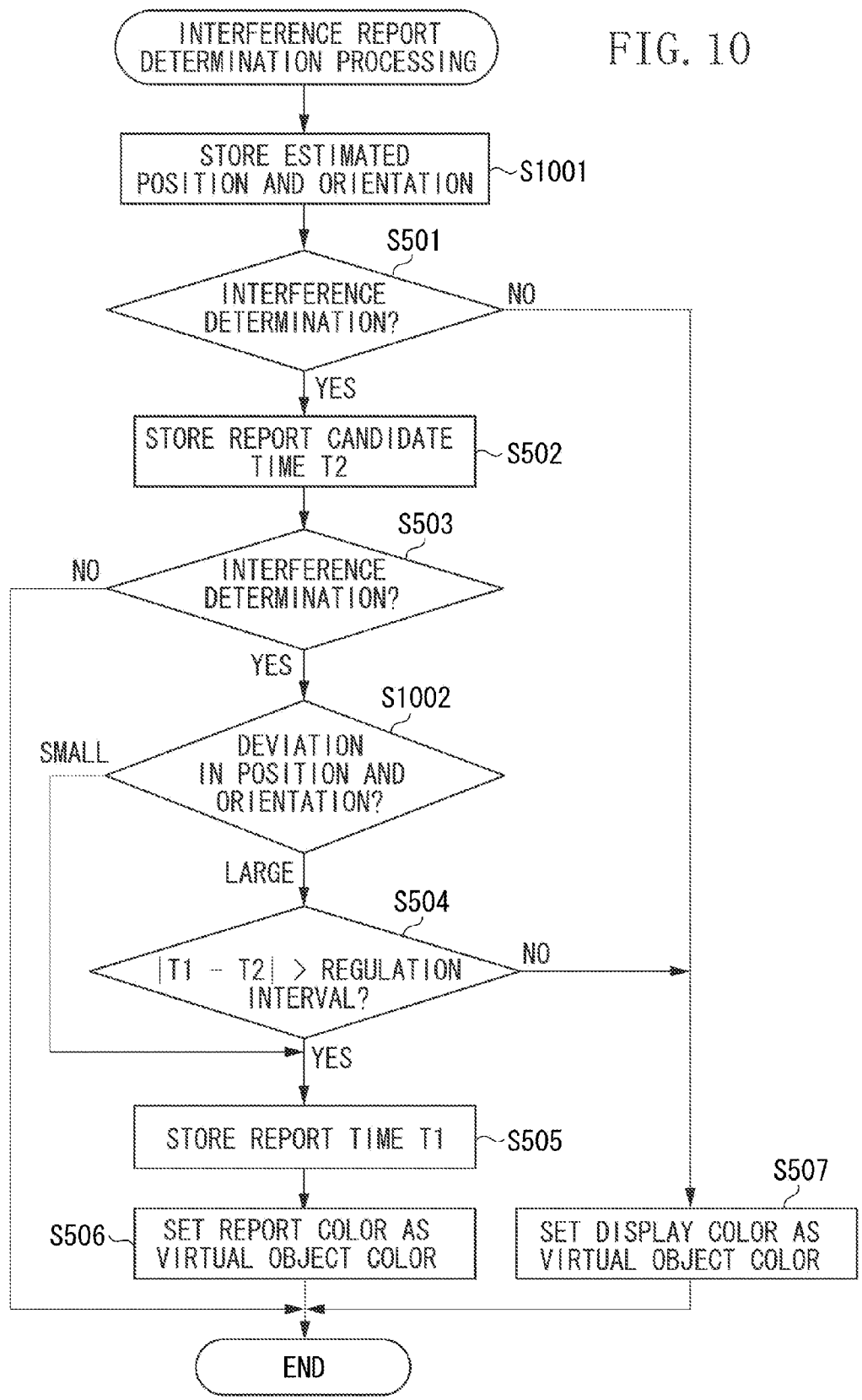
FIG. 10 is a flowchart illustrating details of interference report determination processing according to a fourth exemplary embodiment.

FIG. 10 is a flowchart illustrating details of the interference report determination processing according to the present exemplary embodiment. In step S1001, the position and orientation acquisition unit 108 stores estimated position and orientation of the virtual object 801, i.e., the hand, together with estimation time in the RAM 230.

In step S1002, the interference report determination unit 106 determines a degree of sureness with respect to the position and orientation estimated from a temporal transition of the virtual object 801 in the position and orientation with reference to the information stored in the RAM 230.

In the present exemplary embodiment, the depth from the image captured based on the position and orientation of the virtual object is stored in the RAM 230 and is used. More specifically, the interference report determination unit 106 obtains a deviation from a moving average in the time direction during a predetermined time from the present time and determines the degree of sureness with respect to the estimated position and orientation based on the deviation of the depth from the moving average.

Figure 11A:
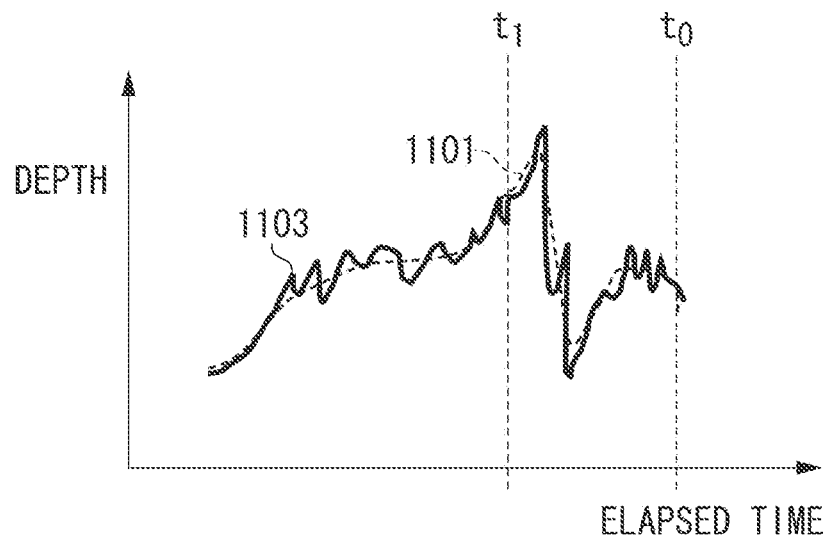
FIGS. 11A and 11B are characteristic diagrams schematically illustrating transitions of position and orientation estimation result in relation to elapsed time according to the fourth exemplary embodiment.
Figure 11B:
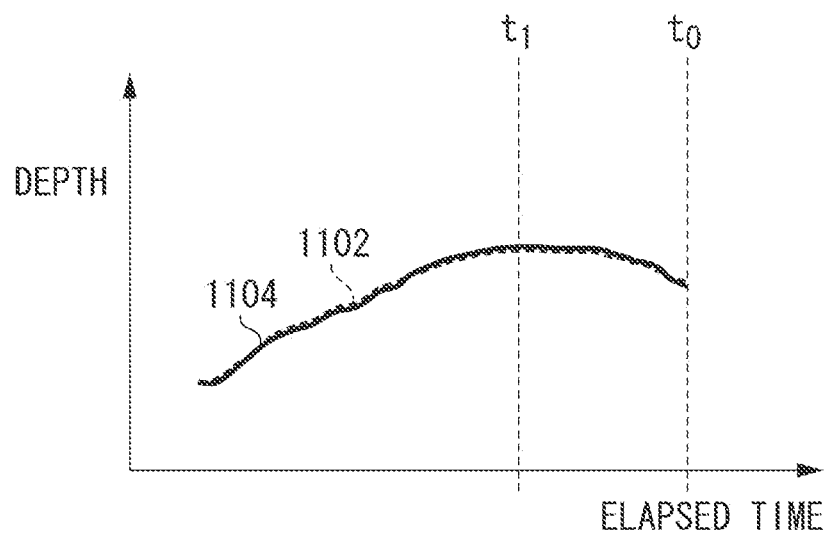

FIGS. 11A and 11B illustrate examples of a characteristic diagram that indicates the depth of the virtual object 801 in relation to the elapsed time according to the present exemplary embodiment.

FIG. 11A is a graph illustrating an exemplary depth 1101 of the virtual object 801 plotted by estimating the position and orientation of the virtual object 801 based on captured images containing a large amount of noise, in relation to a moving average 1103 of the depth 1101 in the time direction. In the present exemplary embodiment, the information processing apparatus obtains a deviation of the depth 1101 from the moving average 1103 during a predetermined time interval from t1 to t0 (present time).

FIG. 11B is a graph illustrating an exemplary depth 1102 of the virtual object 801 plotted by estimating the position and orientation of the virtual object 801 based on captured images containing a smaller amount of noise, in relation to a moving average 1104. In this case, the depth 1102 substantially coincides with the moving average 1104 because the variation of the depth 1102 of the virtual object 801 is smaller. Therefore, it is understood that a deviation of the depth 1102 from the moving average 1104 is smaller compared to the state illustrated in FIG. 11A.

In step S1002 if it is determined that the deviation is large (see FIG. 11A), the operation proceeds to step S504. If it is determined that the deviation is small (see FIG. 11B), the operation proceeds to step S505.

As described above, in reporting the interference between the virtual objects 301 and 801, the information processing apparatus according to the present exemplary embodiment changes the degree of control in determining whether to perform the report based on the time elapsed since the final report with reference to the temporal change amount of the position and orientation of the virtual object. Therefore, the information processing apparatus can determine the sureness of the estimation based on the position and orientation estimation result, irrespective of the contents of the virtual object position and orientation estimation method. If the deviation is small (reliable) in the period of time immediately before the position and orientation estimation result, the information processing apparatus can accurately present the report to the user.

Hereinafter, a fifth exemplary embodiment will be described in detail below. In the above-described exemplary embodiment, the information processing apparatus determines whether to report the interference between virtual objects with reference to at least the time elapsed since the final report. Therefore, it is feasible to prevent the report from being excessively presented to the user. However, if it is determined not to perform the virtual object interference report through the interference report determination process-ing, it can be difficult to report all of the changes occurring in the interference state during the regulation interval.

The present exemplary embodiment differs in part from the above-mentioned exemplary embodiment in the interference report determination processing and the virtual object drawing unit 104.

In the present exemplary embodiment, the virtual object drawing unit 104 generates an image in which the virtual objects 301 and 302 are drawn. More specifically, in generating the image, the virtual object drawing unit 104 refers to an alpha blend rate of each report color calculated by the interference report determination unit 106, as well as the model data stored in the virtual object database.

Figure 13:
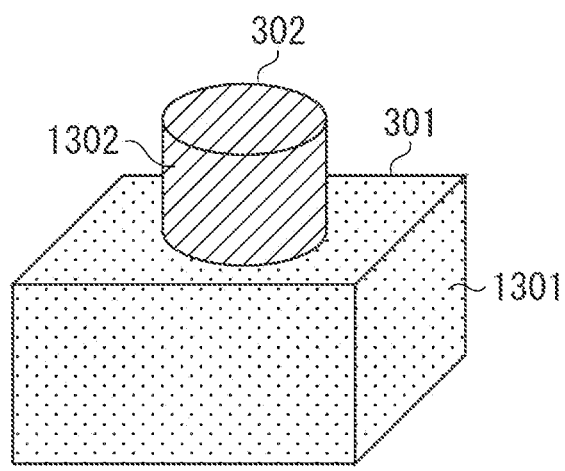
FIG. 13 schematically illustrates a virtual space image according to the fifth exemplary embodiment.

FIG. 13 schematically illustrates an example of the virtual space image according to the present exemplary embodiment. The virtual space image generated by the virtual object drawing unit 104 is illustrated in FIGS. 3B and 13. The virtual object drawing unit 104 according to the present exemplary embodiment draws the virtual objects 301 and 302 with the color obtainable by alpha-blending the above-mentioned display color with the report color according to the alpha blend rate calculated through interference report determination processing described below.

FIG. 3B illustrates a state where the alpha blend rate of the report color is 1, in which the virtual object 301 is drawn with the report color 303 obtainable by alpha-blending the display color with the report color 303 at a rate of 100% and the virtual object 302 is drawn with the report color 304.

FIG. 13 illustrates a state where the alpha blend rate of the report color is 0.5, in which the virtual object 301 is drawn with a color 1301 obtainable by alpha-blending the display color with the report color 303 at a rate of 50% and the virtual object 302 is drawn with a color 1302 obtainable by alpha-blending the report color 304 at the rate of 50%.

Figure 12:
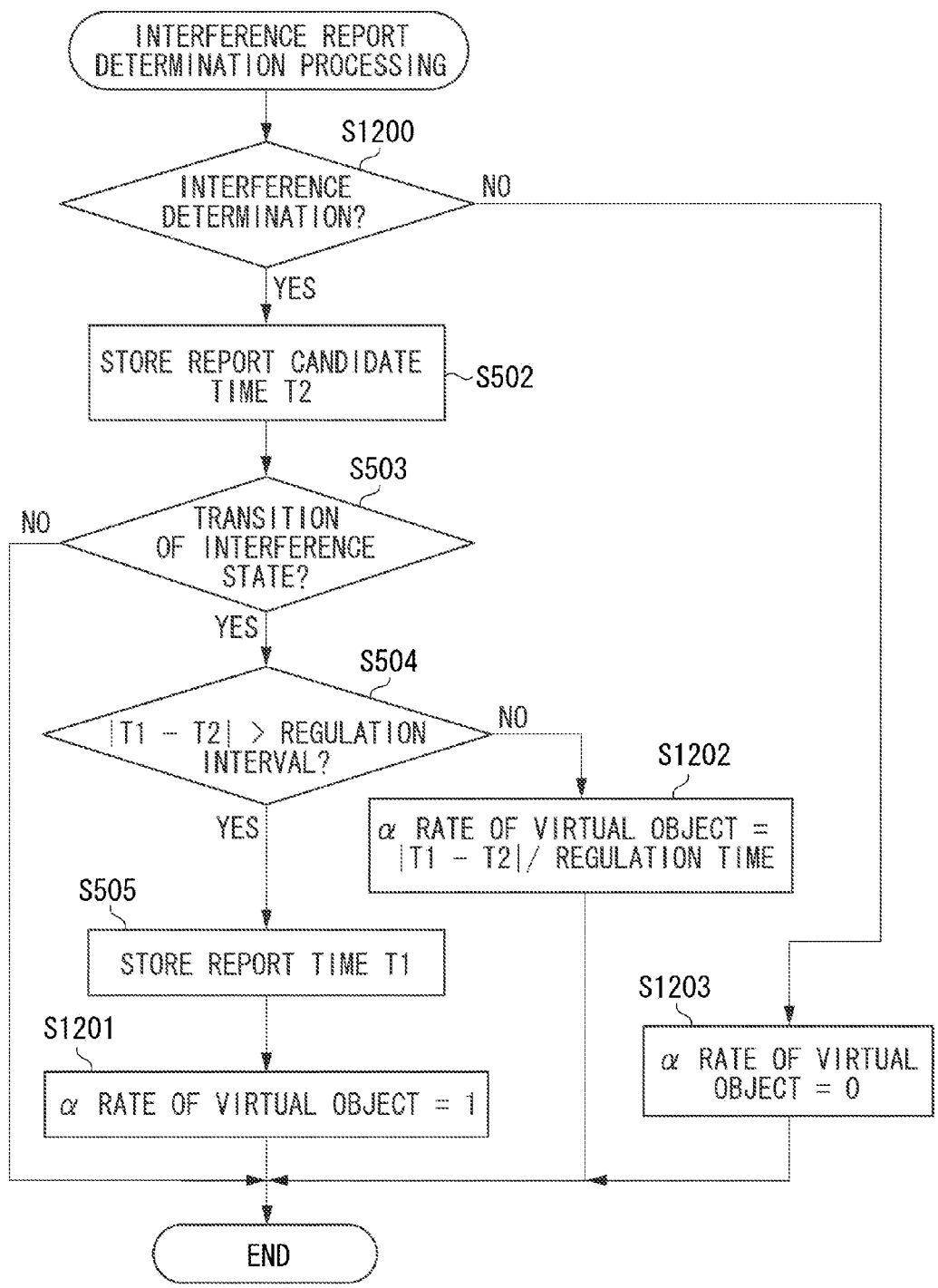
FIG. 12 is a flowchart illustrating details of interference report determination processing according to a fifth exemplary embodiment.

FIG. 12 is a flowchart illustrating details of the interference report determination processing according to the present exemplary embodiment. In step S1200, the interference determination unit 103 determines whether the polygons constituting the virtual objects 301 and 302 intersect with each other with reference to the virtual objects 301 and 302 stored in the RAM 230. If it is determined that the polygons of the virtual objects intersect, i.e., interfere, with each other (YES in step S1200), the operation proceeds to step S502. If it is determined that the polygons of the virtual objects do not interfere with each other (NO in step S1200), the operation proceeds to step S1203.

In step S1201, when the report interval is greater than the regulation interval, the interference report determination unit 106 sets the alpha blend rates of the above-mentioned report colors of the virtual objects 301 and 302 to 1.

In step S1202, when the report interval is not greater than the regulation interval, the interference report determination unit 106 obtains a rate of the report interval relative to the regulation interval and sets the obtained rate as the alpha blend rates of the above-mentioned report colors of the virtual objects 301 and 302.

In the present exemplary embodiment, the regulation interval is one second. In the state illustrated in FIG. 13, the report interval is 0.5 seconds. Therefore, the alpha blend rate of the virtual object 301 is set to 0.5 and the virtual object 301 is drawn with the report color 1301 that is thinner by 50% than the report color 303 illustrated in FIG. 3B. Similarly, the alpha blend rate of the virtual object 302 is set 0.5 and the virtual object 302 is drawn with the report color 1302 that is thinner by 50% than the report color 304 illustrated in FIG. 3B. In step S1203, the interference report determination unit 106 sets the alpha blend rates of the above-mentioned report colors of the virtual objects 301 and 302 to 0.

As described above, the information processing apparatus according to the present exemplary embodiment changes the alpha blend rate of the report color to be used to display each virtual object according to the time elapsed since the final report in reporting the interference between the virtual objects 301 and 302. The information processing apparatus according to the present exemplary embodiment can suppress a steep change from the display color to the report color during the regulation interval by controlling transparency related information, i.e., the alpha blend rate, according to the time elapsed since the final report. Further, moderating the change in color is useful to prevent the report from being excessively presented to the user and appropriately present the interference report to the user during the regulation interval.

Hereinafter, a sixth exemplary embodiment will be described in detail below. The information processing apparatus according to the above-described exemplary embodiment changes the alpha blend rate of the report color according to the ratio of the report interval to the regulation interval and moderately reports the interference to the user during the regulation interval. The present exemplary embodiment differs from the above-described exemplary embodiment in that the information processing apparatus changes the virtual object drawing method if the report interval is smaller than the regulation interval, to prevent the virtual object from unnecessarily changing according to the interference report, as described in detail below.

In the present exemplary embodiment, the virtual object drawing unit 104 generates an image in which the virtual objects 301 and 302 are drawn. More specifically, in generating the image, the virtual object drawing unit 104 refers to as a polygon color and a wire color to be set by the interference report determination unit 106 as well as the model data stored in the virtual object database 101.

Figure 14:
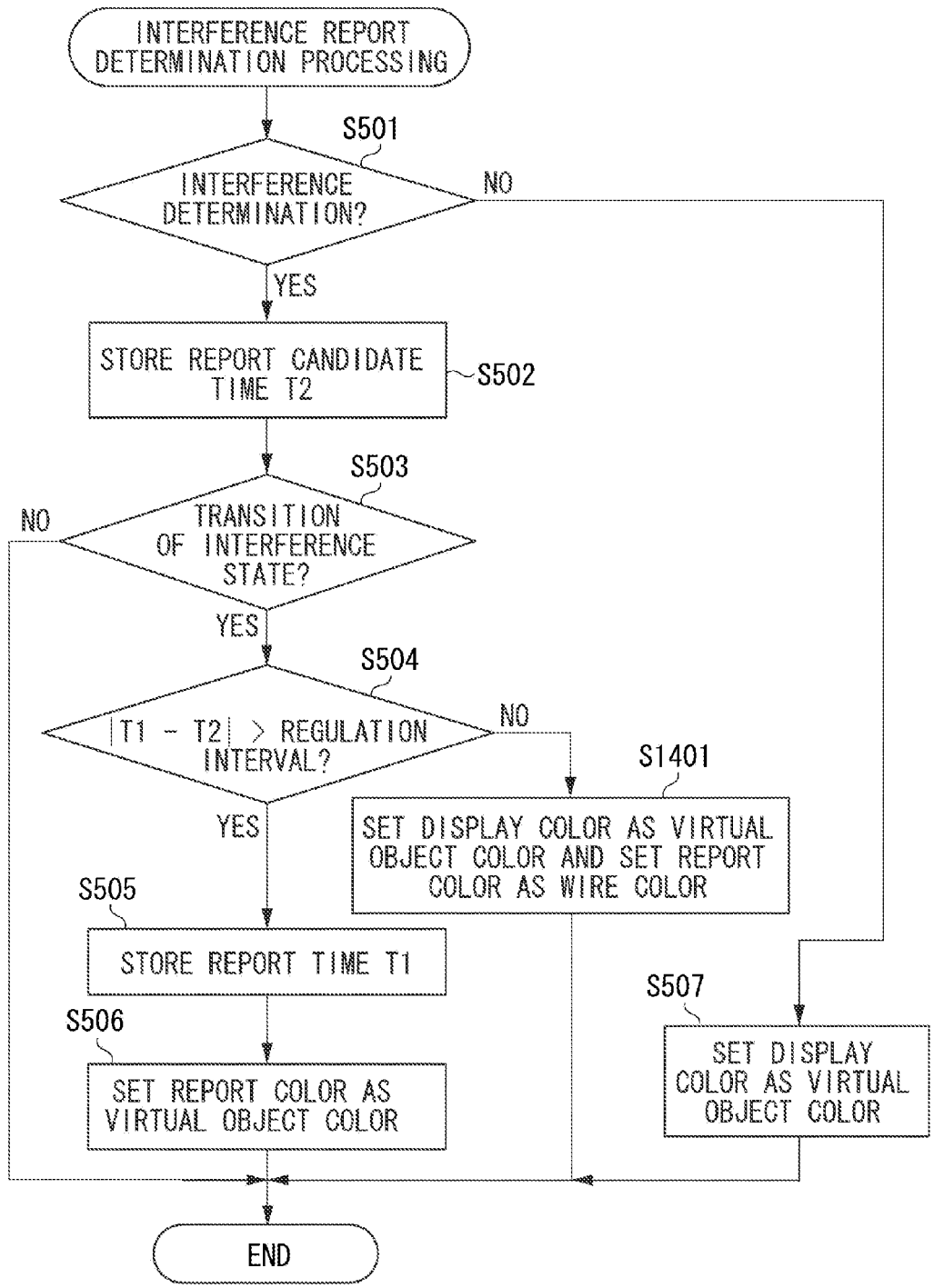
FIG. 14 is a flowchart illustrating details of interference report determination processing according to a sixth exemplary embodiment.

FIG. 14 is a flowchart illustrating details of the interference report determination processing according to the present exemplary embodiment. In step S1401, the interference report determination unit 106 sets the display color as the color of polygons of the virtual objects and sets the report color as the color of wireframes when the report interval is smaller than the regulation interval. In the present exemplary embodiment, the colors to be set in steps S506 and S507 are the polygon color and no color is set for the wireframes.

Figure 15:
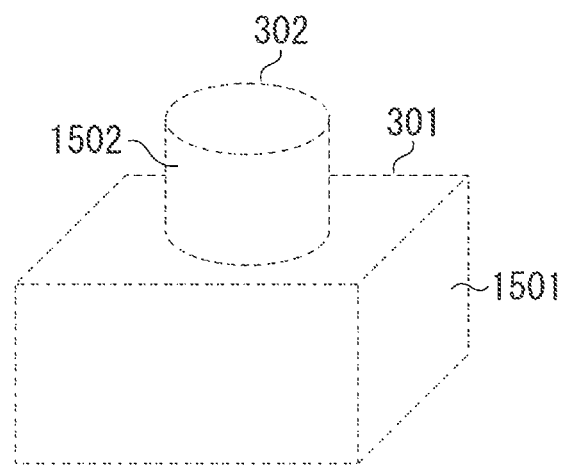
FIG. 15 schematically illustrates a virtual space image according to the sixth exemplary embodiment.

FIG. 15 schematically illustrates an example of the virtual space image according to the present exemplary embodiment.

FIG. 15 illustrates the virtual objects 301 and 302 in a state where the report interval is smaller than the regulation interval. The polygon of the virtual object 301 is drawn with the display color and the wireframe of the virtual object 301 is drawn with a report color 1501. The polygon of the virtual object 302 is drawn with the display color and the wireframe of the virtual object 302 is drawn with a report color 1502.

As described above, in reporting the interference between the virtual objects 301 and 302, the information processing apparatus according to the present exemplary embodiment changes an application range of the report color to be used when the virtual object is displayed according to the time elapsed since the final report. More specifically, when the time elapsed since the final report exceeds a regulation time, the information processing apparatus sets the report color for a predetermined range, e.g., the entire range, of the virtual object and reports the interference state with the report color occupying the larger area. If the time elapsed since the final report does not exceed the regulation time, the information processing apparatus sets the report color for a narrower range, e.g., only the wireframe, of the virtual object and reports the interference state with the report color occupying the smaller area. As described above, in the present exemplary embodiment, the information processing apparatus reduces the color changing area if the time elapsed since the previous report is shorter than the regulation time. Therefore, the information processing apparatus can prevent the report from being excessively presented to the user and can appropriately present the interference report to the user during the regulation interval.

Other Exemplary Embodiments

In each of the above-described exemplary embodiments, the interference report determination unit 106 controls the change of the display color of each virtual object according to the time elapsed since the previous report. Alternatively, the interference determination unit 103 can be configured to realize the same report method. More specifically, in a case where virtual objects interfere with each other, the interference determination unit 103 can be configured to output a non-interference detection result instead of outputting an interference detection result if the predetermined time has not yet elapsed since the previous report. The interference determination unit 103 can be configured to output the interference detection result when virtual objects interfere with each other if it is determined that the predetermined time has already elapsed since the previous report.

Then, if the interference notification unit 112 receives the interference detection result from the interference determination unit 103, the interference notification unit 112 sets the report color as the color of the virtual object to be used in the report. If the interference notification unit 112 receives the non-interference detection result from the interference determination unit 103, the interference notification unit 112 sets the display color as the color of the virtual object.

As described above, the interference determination unit 103 can be modified in such a way as to change the display color of each virtual object according to time elapsed since the previous report. As a result, the interference determination unit 103 can bring desired effects in the report comparable to those obtained by the interference report determination unit 106. In this case, the interference report determination unit 106 can be omitted.

In each of the above-described exemplary embodiments, the information processing apparatus performs interference report processing when virtual objects interfere with each other in a composite image, i.e., an MR image. However, the application of the present exemplary embodiments is not limited to only the interference between virtual objects. For example, it is feasible to apply the present exemplary embodiments to an apparatus that reports the interference between a virtual object and a physical object, e.g., a user's hand. For example, in a case where a physical object included in a captured image is displayed as an actual image in a composite image, i.e., MR image, it is feasible to determine whether the physical object interferes with a virtual object by estimating the position and orientation of the physical object as described in the third exemplary embodiment. Further, in reporting the interference between the physical object and the virtual object, the information processing apparatus can be configured to change the display color of the virtual object with reference to the time elapsed since the previous report.

As described above, the exemplary embodiments can improve usability because an information processing apparatus can adequately perform the report about the interference between a virtual object and a target object while preventing the interference report from being excessively presented.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-021057, filed Feb. 5, 2016, which is hereby incorporated by reference herein in its entirety.

What is claimed is:

1. An information processing apparatus to display a three-dimensional space in which a first virtual object and a second object are present, the information processing apparatus comprising:
a processor; and
a memory storing instructions that, when executed by the processor, cause the processor to perform operations comprising:
determining a positional relationship between the first virtual object and the second object in the three-dimensional space; and
reporting, based on a determination result obtained by the determining, that a distance between the first virtual object and the second object is less than or equal to a predetermined value,
wherein after a previous report has been reported, the reporting does not report before a predetermined time elapses since the previous report and reports if the distance becomes less than or equal to the predetermined value again after the predetermined time has elapsed since the previous report.

2. The information processing apparatus according to claim 1, wherein the operations further comprises:
calculating an area ratio of the first virtual object to be displayed,
wherein the reporting reports if the calculated area ratio is less than a predetermined value before the predetermined time elapses since the previous report.

3. The information processing apparatus according to claim 1, wherein the reporting reports by changing a color of the first virtual object.

4. The information processing apparatus according to claim 1, wherein the second object is a virtual object.

5. The information processing apparatus according to claim 1, wherein the second object is a physical object.

6. The information processing apparatus according to claim 5, wherein the second object is a user's hand.

7. An information processing method for causing a display unit to display a three-dimensional space in which a first virtual object and a second object are present, the information processing method comprising:
determining a positional relationship between the first virtual object and the second object in the three-dimensional space; and
reporting, based on the determination result, that a distance between the first virtual object and the second object is less than or equal to a predetermined value,
wherein after a previous reporting has been performed, the reporting is not performed if the distance becomes less than or equal to the predetermined value again before a predetermined time elapses since the previous reporting and the reporting is performed if the distance becomes less than or equal to the predetermined value again after the predetermined time has elapsed since the previous reporting.

8. A non-transitory computer-readable recording medium that stores computer-executable instructions for causing a computer to execute an information processing method for causing a display unit to display a three-dimensional space in which a first virtual object and a second object are present, the information processing method comprising:
determining a positional relationship between the first virtual object and the second object in the three-dimensional space; and
reporting, based on the determination result, that a distance between the first virtual object and the second object is less than or equal to a predetermined value,
wherein after a previous reporting has been performed, the reporting is not performed if the distance becomes less than or equal to the predetermined value again before a predetermined time elapses since the previous reporting and the reporting is performed if the distance becomes less than or equal to the predetermined value again after the predetermined time has elapsed since the previous reporting.

* * * * *